US007569813B2

(12) United States Patent
Hager

(10) Patent No.: US 7,569,813 B2
(45) Date of Patent: Aug. 4, 2009

(54) METHOD FOR ENHANCING MASS ASSIGNMENT ACCURACY

(75) Inventor: James Hager, Mississauga (CA)

(73) Assignees: MDS Analytical Technologies, a business unit of MDS Inc., Concord, Ontario (CA); Applied Biosystems, LLC, Framingham, MA (US)

( * ) Notice: Subject to any disclaimer, the term of this patent is extended or adjusted under 35 U.S.C. 154(b) by 182 days.

(21) Appl. No.: 11/842,251

(22) Filed: Aug. 21, 2007

(65) Prior Publication Data

US 2009/0050796 A1 Feb. 26, 2009

(51) Int. Cl.
*H01J 49/42* (2006.01)
*B01D 59/44* (2006.01)
*G01D 18/00* (2006.01)

(52) U.S. Cl. ........................ 250/282; 250/292; 250/281; 250/252.1

(58) Field of Classification Search ................. 250/282, 250/292, 281, 252.1
See application file for complete search history.

(56) References Cited

U.S. PATENT DOCUMENTS

| | | | | |
|---|---|---|---|---|
| 5,572,025 A * | 11/1996 | Cotter et al. | 250/292 |
| 6,504,148 B1 * | 1/2003 | Hager | 250/282 |
| 7,227,130 B2 * | 6/2007 | Hager et al. | 250/282 |
| 7,365,319 B2 * | 4/2008 | Hager et al. | 250/292 |
| 2003/0138823 A1 | 7/2003 | Brock et al. | |
| 2004/0188605 A1 | 9/2004 | Tang et al. | |
| 2005/0023454 A1 | 2/2005 | Bateman et al. | |
| 2006/0108520 A1 * | 5/2006 | Park et al. | 250/287 |
| 2007/0164231 A1 | 7/2007 | Truche et al. | |

OTHER PUBLICATIONS

Jon D. Williams et al., "Improved accuracy of mass measurement with a quadrupole ion-trap mass spectrometer": Rapid Communications in Mass Spectrometry, vol. 6, pp. 524-527, 1992, whole document.

International Search Report and Written Opinion, PCT/CA2007/001459, date of mailing May 15, 2008.

J. Mitchell Wells, Wolfgang R. Plass, R. Graham Cooks; "Control of Chemical Mass Shifts in the Quadrupole Ion Trap through Selection of Resonance Ejection Working Point and rf Scan Direction"; Analytical Chemistry, vol. 72, No. 13, Jul. 1, 2000; pp. 2677-2683.

* cited by examiner

*Primary Examiner*—Nikita Wells
(74) *Attorney, Agent, or Firm*—Bereskin & Parr LLP/S.E.N.C.R.L., s.r.l.

(57) ABSTRACT

A method of operating an ion trap spectrometer system having an ion trap is provided. The method comprises a) providing a group of ions for analysis, wherein the group of ions includes a first analyte; b) providing a filtered first analyte having a first mass-to-charge ratio by filtering out ions other than the first analyte; c) storing the filtered first analyte in the ion trap; d) storing a first set of calibrant ions in the ion trap with the filtered first analyte, wherein the first set of calibrant ions has at least one calibrant ion and each calibrant ion in the first set of calibrant ions has a known mass-to-charge ratio; e) transmitting the filtered first analyte and the first set of calibrant ions from the ion trap for detection; f) detecting the filtered first analyte to generate a first analyte mass signal peak representing the filtered first analyte, and detecting each calibrant ion in the first set of calibrant ions to generate an associated calibrant mass signal peak for each calibrant ion in the first set of calibrant ions; and, g) calibrating a first mass signal derived from the first analyte mass signal peak by comparing the known mass-to-charge ratio and the associated calibrant mass signal peak for each calibrant ion in the first set of calibrant ions.

9 Claims, 3 Drawing Sheets

METHOD FOR ENHANCING MASS ASSIGNMENT ACCURACY

FIELD

This invention relates to a method for operating an ion trap mass spectrometer system.

INTRODUCTION

The mass assignment accuracy of an ion trap mass spectrometer system can be enhanced through internal calibration, in which both the ions of interest and the calibrants are admitted to, and subsequently transmitted from, the linear ion trap. The measured spectra for the calibrants can then be compared to their previously-known exact theoretical values to provide calibrated values for the measured spectra of the ions of interest.

SUMMARY

In accordance with an aspect of an embodiment of the invention, there is provided a method of operating an ion trap spectrometer system having an ion trap. The method comprises a) providing a group of ions for analysis, wherein the group of ions includes a first analyte; b) providing a filtered first analyte having a first mass-to-charge ratio by filtering out ions other than the first analyte; c) storing the filtered first analyte in the ion trap; d) storing a first set of calibrant ions in the ion trap with the filtered first analyte, wherein the first set of calibrant ions has at least one calibrant ion and each calibrant ion in the first set of calibrant ions has a known mass-to-charge ratio; e) transmitting the filtered first analyte and the first set of calibrant ions from the ion trap for detection; f) detecting the filtered first analyte to generate a first analyte mass signal peak representing the filtered first analyte, and detecting each calibrant ion in the first set of calibrant ions to generate an associated calibrant mass signal peak for each calibrant ion in the first set of calibrant ions; and, g) calibrating a first mass signal derived from the first analyte mass signal peak by comparing the known mass-to-charge ratio and the associated calibrant mass signal peak for each calibrant ion in the first set of calibrant ions.

These and other features of the applicant's teachings are set forth herein

BRIEF DESCRIPTION OF THE DRAWINGS

The skilled person in the art will understand that the drawings, described below, are for illustration purposes only. The drawings are not intended to limit the scope of the applicant's teachings in any way.

DESCRIPTION OF VARIOUS EMBODIMENTS

Figure 1:
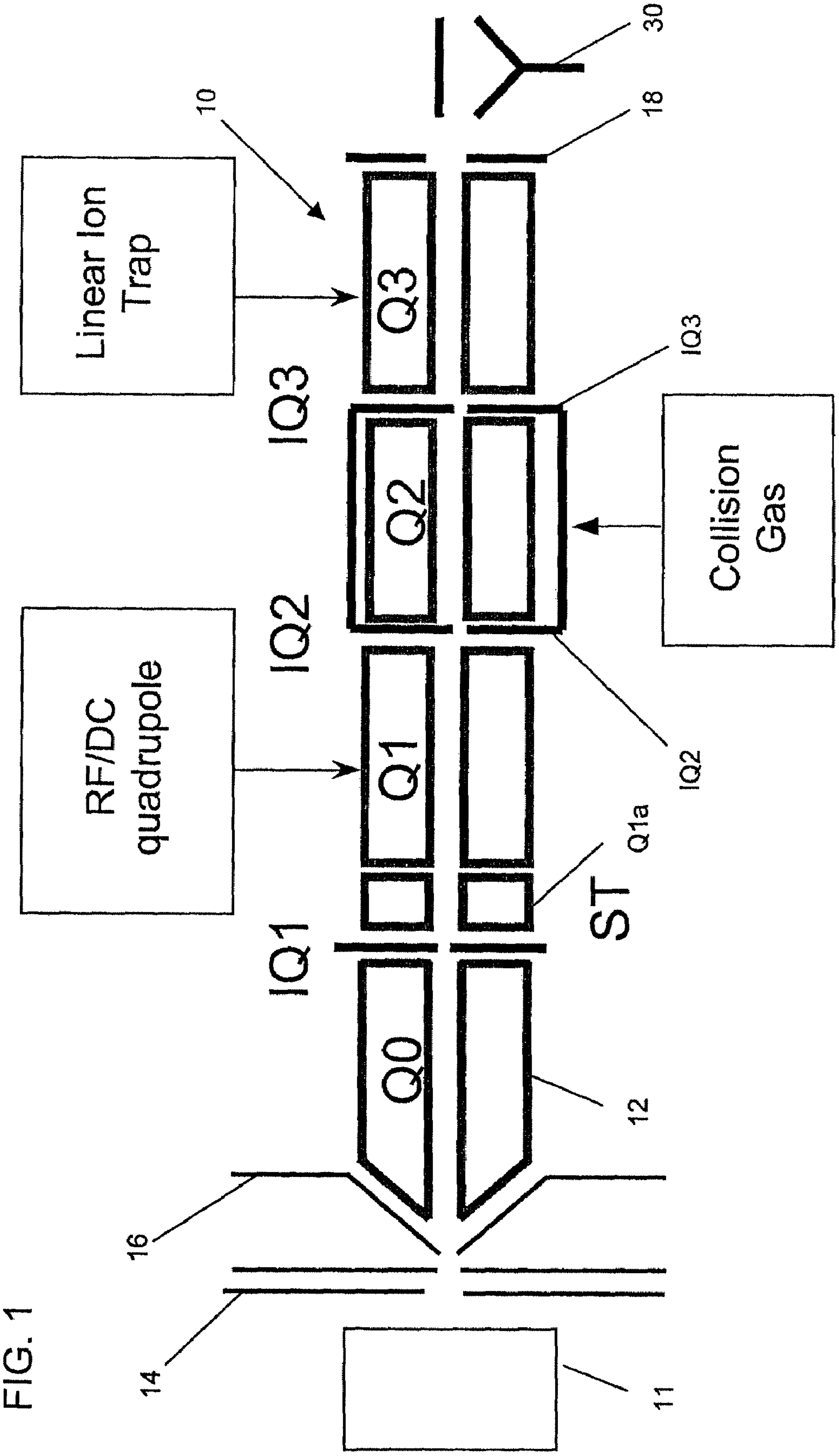
FIG. 1, in a schematic diagram, illustrates a linear ion trap mass spectrometer system that can be operated to implement a method in accordance with an aspect of a first embodiment of the present invention.

Referring to FIG. 1, there is illustrated in a schematic diagram, a linear ion trap mass spectrometer system 10, as described by Hager and LeBlanc in Rapid Communications of Mass Spectrometry System 2003, 17, 1056-1064. During operation of the mass spectrometer system, ions from an ion source 11 can be admitted into a vacuum chamber 12 through an orifice plate 14 and skimmer 16. The linear ion trap mass spectrometer system 10 comprises four elongated sets of rods Q0, Q1, Q2, and Q3, with orifice plates IQ1 after rod set Q0, IQ2 between Q1 and Q2, and IQ3 between Q2 and Q3. An additional set of stubby rods Q1*a* is provided between orifice plate IQ1 and elongated rod set Q1.

In some cases, fringing fields between neighboring pairs of rod sets may distort the flow of ions. Stubby rods Q1*a* are provided between orifice plate IQ1 and elongated rod set Q1 to focus the flow of ions into the elongated rod set Q1.

Ions can be collisionally cooled in Q0, which may be maintained at a pressure of approximately $8\times10^{-3}$ torr. Both the transmission mass spectrometer Q1 and the downstream linear ion trap mass spectrometer Q3 are capable of operation as conventional transmission RF/DC multipole mass spectrometers. Q2 is a collision cell in which ions collide with a collision gas to be fragmented into products of lesser mass. Typically, ions may be trapped in the linear ion trap mass spectrometer Q3 using RF voltages applied to the multiple rods, and barrier voltages applied to the end aperture lenses 18. Q3 can operate at pressures of around $3\times10^{-5}$ torr, as well as at other pressures in the range of $10^{-5}$ torr to $10^{-4}$ torr.

Figure 2:
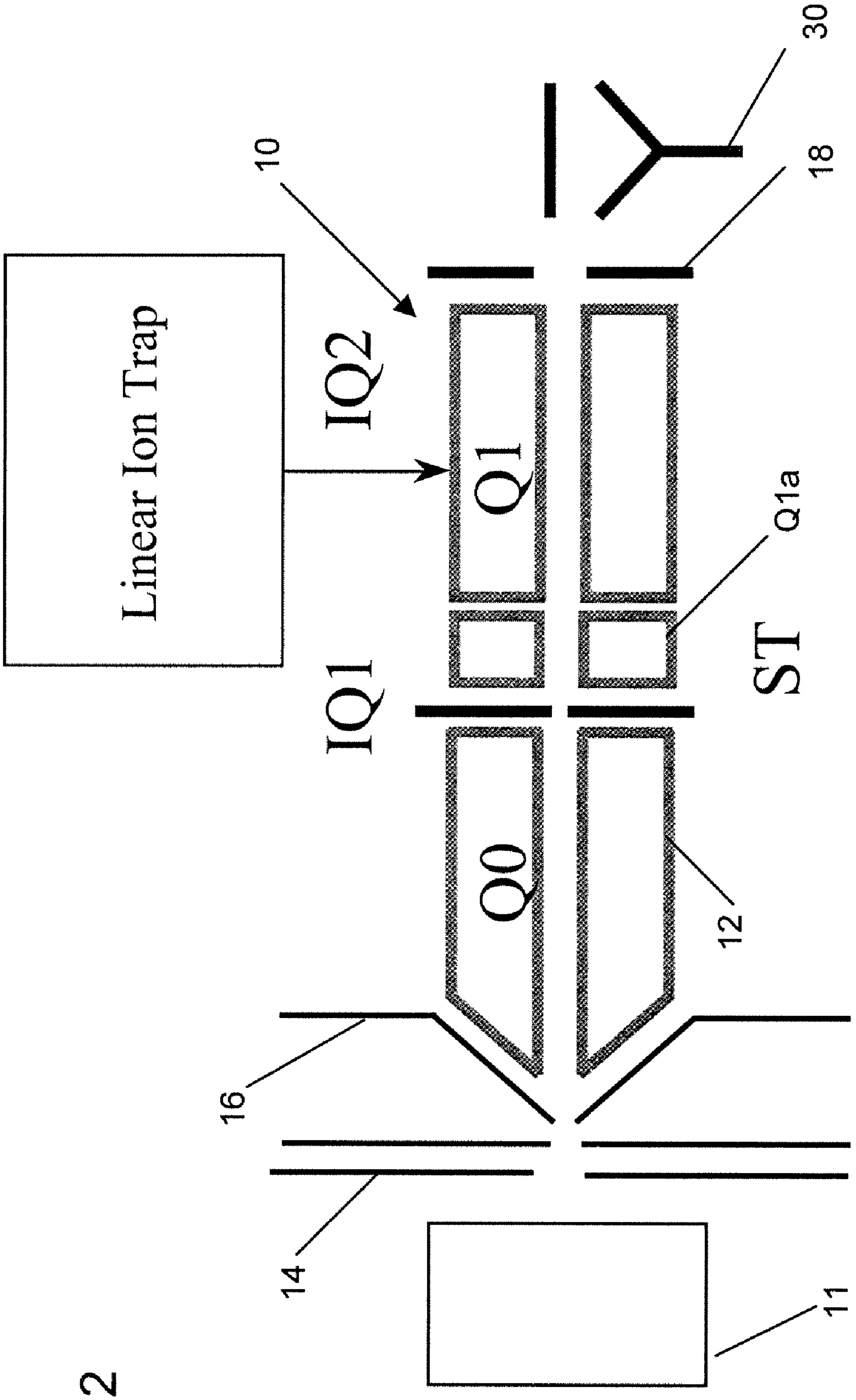
FIG. 2, in a schematic diagram, illustrates a second linear ion trap mass spectrometer system that may be operated to implement a method in accordance with an aspect of a second embodiment of the present invention.

Referring to FIG. 2, there is illustrated in a schematic diagram, an alternative linear ion trap mass spectrometer system 10. For clarity, the same reference numbers as those used in respect of the linear ion trap mass spectrometer system of FIG. 1 are used with respect to the linear ion trap mass spectrometer system of FIG. 2. For brevity the description of FIG. 1 is not repeated with respect to FIG. 2.

The linear ion trap mass spectrometer system of FIG. 2 resembles that of FIG. 1, except that in FIG. 2, elements IQ2, Q2, IQ3 and Q3 have been removed. Further, Q1 in FIG. 2 is a linear ion trap.

Many methods of internal calibration involve sequential measurements of calibrant ions followed by sequential measurements of analyte ions. This approach can have limitations for ion trapping devices since mass assignment accuracy can be influenced by the number and nature of the trapped ion population. These factors will usually be different for the calibrant and analyte ions when a sequential approach is used limiting mass assignment accuracy.

One of the limitations of ion trap mass spectrometers in terms of achieving high mass assignment accuracy is that the reported mass-to-charge ratio of such devices often depends on the number and nature of the trapped ion population due to the effects of space charge. The lowest m/z range of the ion trap may suffer more from space charge than the upper range because the number of trapped ions is typically greater during the mass scan of the lowest m/z ions (assuming the mass scans begins with the ions of lower m/z and proceeds to those of higher m/z). By the time the higher m/z ions are scanned the number of trapped ions has usually been reduced considerably. Space charge can affect the apparent m/z assignment of an ion trap as well as the width of the peak in the resulting spectrum. Ion traps are also susceptible to changes in mass calibration due to changes in temperature that have occurred between the time of external mass calibration and the time of the analytical scan.

This method can be implemented using, but is not limited to, linear ion traps, especially those of the QqQLIT such as the linear ion trap mass spectrometer of FIG. 1. This QqQLIT linear ion trap (LIT) arrangement allows the ions from the ion source to be mass analyzed by Q1 and fragmented (if desired—Q2 can alternatively be used to simply transmit the unfragmented ions to Q3) via collisional activation in Q2. The fact that the stream of ions from the ion source can be mass resolved upstream of the LIT means that disparate ions can be admitted into the LIT using consecutive "fill" steps simply by changing the settings of the resolving Q1 mass filter during each "fill" step. Furthermore, the ions emanating from Q1 may be fragmented in Q2 if desired. Thus, analyte and internal calibrant ions can be admitted into the LIT (prior to a mass scan) through a series of "fill" steps. Most often the analyte ions will be fragmented to yield a product ion mass spectrum and the internal calibrant ions will be admitted un-fragmented, although the calibrant ions may also be subjected to fragmentation if desired.

The advantage of such a process is that, with properly chosen calibrant ions, the analyte ions and the calibrant ions experience approximately the same amount of space charge force allowing enhanced mass assignment accuracy. The co-trapped internal calibrant ions also allow compensation for systematic errors which may have affected the external mass calibration, such as changes in room and instrument temperatures.

Table 1 is an example of a simplified scan sheet used to implement the method is presented. Here, a single calibrant ion is mass filtered by Q1 using a narrow transmission window such that all other ions in the sample are rejected, transmitted through Q2 at low translational energy to minimize fragmentation, and admitted into the Q3 LIT. Additional calibrant ions can also be provided in the same manner. The settings of Q1 can then be immediately changed to transmit the precursor m/z of an analyte ion, which can be fragmented via collisional activation in Q2. The fragments and residual analyte precursor ion are then admitted into the Q3 LIT. The Q3 LIT now contains both calibrant ions and fragment analyte ions. All of the trapped ions can then be cooled for several tens of milliseconds and a mass scan carried out by axially ejecting the trapped ions for detection by detector 30. The resulting mass spectrum will have contributions from the fragmented analyte ion as well as from the un-fragmented calibrant ions. The apparent m/z value of the co-trapped calibrant ion can be used to adjust the mass calibration for the analyte fragment ions. One can add several calibrant ions prior to the cooling and mass scanning steps to further enhance mass assignment accuracy.

TABLE 1

Sample scan sheet showing the various times required to fill the Q3 LIT with un-fragmented calibrant ions at m/z 622, 322, and 118 in addition to fragmented analyte ions.

| | Fill 622+ | Fill 322+ | Fill 118+ | Fill Analyte | Cool | Scan LIT | Empty Trap |
|---|---|---|---|---|---|---|---|
| Time (ms) | 10 | 10 | 10 | Fill Time | 75 | | 2 |

Figure 3:
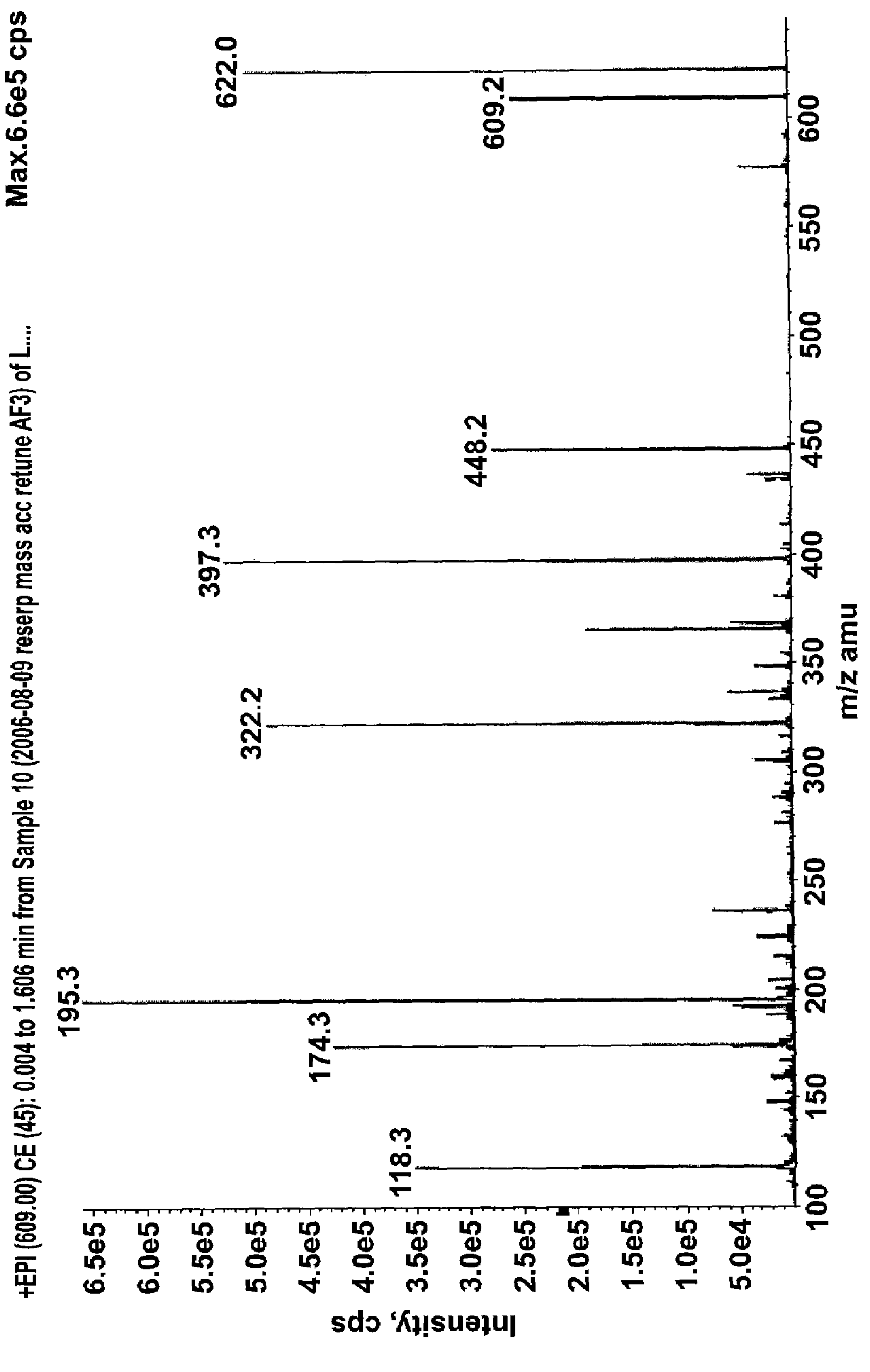
FIG. 3 illustrates a composite product ion spectra of a mixture of the un-fragmented calibrant ions at m/z~118, 322, and 622 as well as the product ions of the analyte, reserpine (m/z~609), obtained by operating the linear ion trap mass spectrometer system of FIG. 1 in accordance with a first aspect of a first embodiment of the present invention.

The resulting mass spectrum is shown in FIG. 3. This Q3 LIT spectrum was obtained using the method in Table 1 and contains contributions from the un-fragmented calibrant ions at m/z~118, 322, and 622 as well as the product ions of reserpine (m/z~609), which was employed as the calibrant.

The utility of this method for improved mass assignment accuracy is illustrated in Table 2. Here, the analyte ion of interest is reserpine with a protonated precursor ion molecular mass of 609.281. The reserpine major fragment ions are at m/z~174, 195, 397, and 448. The re-calibrated mass assignments were obtained by comparing the known mass-to-charge ratio and the associated calibrant mass signal peak for each of the calibrants. Specifically, re-calibrated mass assignments were obtained by using a simple linear interpolation between the theoretical calibrant ion m/z values.

TABLE 2

Illustration of the improvements in mass assignment accuracy, which is possible using the method. The internal calibrant ions are marked with an asterisk.

| Initial Mass Assignment (amu) | Theoretical Assignment (amu) | Difference (amu) | Assignment after Re-calibration (amu) | Difference (amu) |
|---|---|---|---|---|
| 118.3525* | 118.087 | −0.266 | 118.087 | 0.000 |
| 322.1682* | 322.049 | −0.119 | 322.049 | 0.000 |
| 621.9834* | 622.029 | 0.046 | 622.029 | 0.000 |
| 174.324 | 174.092 | −0.232 | 174.099 | −0.007 |
| 195.277 | 195.066 | −0.211 | 195.066 | −0.001 |
| 397.296 | 397.213 | −0.083 | 397.218 | −0.006 |
| 448.246 | 448.197 | −0.049 | 448.196 | 0.001 |
| 609.230 | 609.281 | 0.051 | 609.269 | 0.013 |

This method is generally applicable to all ion trapping mass spectrometers, including RF ion traps, electrostatic ion traps, and Penning ion traps. It is not, however, necessary, to have the capability for m/z selection prior to, or upstream of, the ion trapping device. If there is no upstream mass analyzer, such as in the case of the linear ion trap mass spectrometer system of FIG. 2, then tailored wave forms can be used to simultaneously isolate the calibrant and analyte ions and then, if desired, to resonantly excite the analyte ions to generate a product ion mass spectrum.

That is, say that a group of ions including the particular analyte of interest, as well as the calibrant ions selected for that analyte of interest, are being stored in a linear ion trap Q1 of the linear ion trap mass spectrometer system 10 of FIG. 2. Then, based on the known m/z of the analyte and the calibrant ions, a wave form can be carefully tailored to resonantly excite all of the other ions, while not resonantly exciting the selected calibrant ions and the analyte ion, such that all of the other ions are radially ejected to isolate the calibrant ions and the analyte. This could be done by providing notches in the tailored wave form, such notches being chosen to correspond to the m/z of the calibrant ions and the analyte. Thus, these ions would not be excited by the tailored wave form, or, at any rate, would not be excited as much as the other ions, such that the tailored wave form filters out the other ions. Once these steps have been executed, the calibrants and analyte of interest can be axially ejected from Q1, past end aperture lenses 18 to detector 30 in a manner similar to that described above with respect to the linear ion trap mass spectrometer system of FIG. 1.

It is not necessary that the ion trap be operated as a mass spectrometer. The ion trap may be used to accumulate the calibrant and analyte ions and then transmit the contents of the ion trap to a downstream mass analyzer such as a time-of-flight (ToF) mass spectrometer. An instrument such as QqToF in which the collision cell is operated as an accumulating linear ion trap could be operated in this fashion in order to achieve enhanced mass assignment accuracy.

According to further aspects of different embodiments of the present invention, multiple analytes may be processed in a similar manner to the reserpine ion described above. That is, in the case of methods in accordance with aspects of the present invention implemented using the mass spectrometer system 10 of FIG. 1, after the first analyte (reserpine in the example described above) together with its fragments and calibrants, are stored in Q3, Q1 can be used to provide a filtered second analyte having a second mass to charge ratio by filtering out ions other than the second analyte. Then, once the first analyte, its fragments and its calibrants have been axially transmitted from Q3, the second analyte, together with its fragments (assuming the second analyte has been fragmented in Q2) and the calibrants selected for the second analyte can be stored in Q3. Then, similar to the case described above with respect to the first analyte reserpine, the second analyte, the second set of fragments if any, and a second set of calibrant ions selected for the second analyte and possibly its fragments, can be transmitted from the linear ion trap Q3 for detection by the detector 30. After detection, a second mass signal derived from the second analyte mass signal peak can be calibrated by comparing the known mass to charge ratio and the associated calibrant mass signal peak for each calibrant ion in the second set of calibrant ions. The mass signals for the fragments of the second analyte can be calibrated in a similar manner.

The criteria used to select calibrant ions may differ for different analytes of interest. Specifically, calibrant ions can be selected to "bracket" the particular anaylte, as well as any of its fragments that are of interest. To bracket a particular analyte ion, the set of calibrant ions selected for that analyte ion could include a upper bracket calibrant ion having a mass-to-charge ratio slightly higher than the mass to charge ratio of the analyte. The set of calibrant ions for this analyte could also include a lower bracket calibrant ion having a mass to charge ratio slightly lower than the mass to charge ratio of the analyte. Of course, where fragments of the analyte are also of interest, calibrants should also be selected with the fragments in mind. In the example described above, the first analyte of interest is reserpine, having an m/z of approximately 609, and the reserpine ions were also fragmented in Q2. The resulting major fragment ions have mass to charge ratios of approximately 174, 195, 397 and 448. Accordingly, the first set of calibrant ions were selected to bracket not only the reserpine ion itself, but also the fragment ions. Specifically, the first set of calibrant ions selected for the analyte reserpine had mass to charge ratios of 118, 322 and 622. Thus, the reserpine ion itself, as well as its two larger mass fragments—397 and 448—would be bracketed by the calibrant ions having mass to charge ratios of approximately 322 and 622. Similarly, the small fragment ions having mass to charge ratios of approximately 174 and 195 would be bracketed by the calibrant ions having mass to charge ratios of approximately 118 and 322.

In the case of the second analyte of interest selected, this analyte would probably have a mass to charge ratio higher than that of reserpine, and thus might well have a mass to charge ratio higher than 622, which was the highest mass to charge ratio of all of the calibrant ions in the first set of calibrant ions selected for the first analyte reserpine. Accordingly, the second set of calibrant ions selected for the second analyte, could include a calibrant ion having a mass to charge ratio that is higher than 622, and indeed higher than the mass to charge ratio of the second analyte of interest. The remaining calibrants would be selected based on the mass to charge ratios of the major fragments of the second analyte of interest. That is, in the case of each of these fragments, the second set of calibrant ions could be selected to include an upper bracket calibrant ion having a mass to charge ratio slightly higher than the second analyte mass to charge ratio or fragment mass to charge ratio, and a lower bracket calibrant ion having a mass to charge ratio lower than the mass to charge ratio of the second analyte or fragment.

In addition to choosing calibrant ions to bracket the analyte of interest, the calibrant ions should also be selected to have the same or similar physical and chemical properties, as described, for example, in J. Wells, W. Plass and R. Cooks, "Control of Chemical Mass Shifts in the Quadrupole Ion Trap through Selection of Resonance Ejection Working Point and rf Scan Direction", Analytical Chemistry, 2000, Vol. 72, No. 13, 2677-2683.

Other variations and modifications of the invention are possible. For example, although the foregoing description refers to linear ion traps, it will be appreciated that the ion trap used to implement some aspects of some embodiments of the present invention need not be linear ion traps. In addition, while the foregoing description, as well as FIGS. 1 and 2, contemplate mass analysis by axial ejection, this is not necessary. For example, mass analysis might be provided by radial ejection, as described, for example, by Schwartz et al. Journal of Amer Soc Mass Spectrom 2002, 13, 659-669. All such modifications and variations are believed to be within the sphere and scope of the invention as defined by the claims.

The invention claimed is:

1. A method of operating an ion trap spectrometer system having an ion trap, the method comprising;

a) providing a group of ions for analysis, wherein the group of ions includes a first analyte;

b) providing a filtered first analyte having a first mass-to-charge ratio by filtering out ions other than the first analyte;

c) storing the filtered first analyte in the ion trap;

d) storing a first set of calibrant ions in the ion trap with the filtered first analyte, wherein the first set of calibrant ions has at least one calibrant ion and each calibrant ion in the first set of calibrant ions has a known mass-to-charge ratio;

e) transmitting the filtered first analyte and the first set of calibrant ions from the ion trap for detection;

f) detecting the filtered first analyte to generate a first analyte mass signal peak representing the filtered first analyte, and detecting each calibrant ion in the first set of calibrant ions to generate an associated calibrant mass signal peak for each calibrant ion in the first set of calibrant ions; and, g) calibrating a first mass signal derived from the first analyte mass signal peak by comparing the known mass-to-charge ratio and the associated calibrant mass signal peak for each calibrant ion in the first set of calibrant ions.

2. The method as defined in claim 1 wherein the ion trap mass spectrometer system comprises a mass analyzer upstream of the ion trap; and, step b) comprises configuring the mass analyzer to provide a narrow transmission window to filter out the ions other than the first analyte when transmitting the first analyte.

3. The method as defined in claim 1 wherein step b) comprises applying a tailored wave form to the group of ions to resonantly excite and eject the ions other than the first analyte.

4. The method as defined in claim 3 wherein the tailored wave form applied in step b) is tailored to filter out the ions other than the first analyte without filtering out the first set of calibrant ions.

5. The method as defined in claim 1 further comprising, after step b), fragmenting the first analyte to generate a plurality of first analyte fragments; wherein, step c) further comprises storing the plurality of first analyte fragments in the ion trap;

step e) comprises transmitting the plurality of first analyte fragments from the ion trap for detection;

step f) comprises detecting the plurality of first analyte fragments to generate a plurality of first analyte fragment mass signal peaks; and, step g) comprises calibrating a plurality of first analyte fragment mass signals derived from the plurality of first analyte fragment mass signal peaks by comparing the known mass-to-charge ratio and the associated calibrant mass signal peak for each calibrant ion in the first set of calibrant ions.

6. The method as defined in claim 1 wherein the group of ions comprises a second analyte and the method further comprises b2) after b), providing a filtered second analyte having a second mass-to-charge ratio by filtering out ions other than the second analyte;

c2), after e), storing the filtered second analyte in the ion trap;

d2) after e), storing a second set of calibrant ions in the ion trap with the filtered second analyte, wherein the second set of calibrant ions has at least one calibrant ion and each calibrant ion in the second set of calibrant ions has a known mass-to-charge ratio;

e2) after e), transmitting the filtered second analyte and the second set of calibrant ions from the ion trap for detection;

f2) after f), detecting the filtered second analyte to generate a second analyte mass signal peak representing the filtered second analyte, and detecting each calibrant ion in the second set of calibrant ions to generate an associated calibrant mass signal for each calibrant ion in the second set of calibrant ions;

g2) calibrating a second mass signal derived from the second analyte mass signal peak by comparing the known mass-to-charge ratio and the associated calibrant mass signal peak for each calibrant ion in the second set of calibrant ions.

7. The method as defined in claim 6 wherein d) comprises selecting the first set of calibrant ions to have i) a corresponding first analyte upper bracket calibrant ion having a mass-to-charge ratio higher than the first mass-to-charge ratio, and ii) a first analyte lower bracket calibrant ion having a mass-to-charge ratio lower than the first mass-to-charge ratio; and d1) comprises selecting the second set of calibrant ions to have i) a corresponding second analyte upper bracket calibrant ion having a mass-to-charge ratio higher than the second mass-to-charge ratio, and ii) a second analyte lower bracket calibrant ion having a mass-to-charge ratio lower than the first mass-to-charge ratio.

8. The method as defined in claim 7 wherein the first analyte upper bracket calibrant ion has a first analyte upper bracket mass to charge ratio, the first analyte upper bracket mass to charge ratio being a highest mass to charge ratio of all ions in the first set of calibrant ions; and, the first analyte upper bracket mass to charge ratio is smaller than the second mass to charge ratio.

9. The method as defined in claim 1 wherein the ion trap is a linear ion trap.

* * * * *